United States Patent [19]
Becker

[11] Patent Number: 6,122,153
[45] Date of Patent: Sep. 19, 2000

[54] TEMPERATURE PROTECTION CONTROL FOR A MOTOR STARTER

[75] Inventor: James A. Becker, Grafton, Wis.

[73] Assignee: Eaton Corporation, Cleveland, Ohio

[21] Appl. No.: 09/270,293

[22] Filed: Mar. 15, 1999

[51] Int. Cl.⁷ ....................................................... H02H 5/04
[52] U.S. Cl. ............................................. 361/25; 361/103
[58] Field of Search .............................. 361/23, 25, 93.8, 361/103; 318/641, 806, 783

[56] References Cited

U.S. PATENT DOCUMENTS

| | | | |
|---|---|---|---|
| 4,207,602 | 6/1980 | Kussy et al. | 361/24 |
| 5,220,478 | 6/1993 | Innes et al. | 361/93 |
| 5,680,025 | 10/1997 | Bowers, III et al. | 318/806 |

*Primary Examiner*—Michael J. Sherry
*Attorney, Agent, or Firm*—Boyle Fredrickson Ziolkowski S.C.; Larry Vande Zande

[57] ABSTRACT

A motor starter temperature protection control in which an ambient temperature sensor is positioned on an inside cover of the motor starter to sense ambient temperature across the power poles and heat sinks and provide an ambient temperature signal indicative of the ambient temperature in the motor starter enclosure. A power pole temperature sensor is positioned in thermal communication with each power pole and produce pole temperature signals indicative of the temperature of each power pole. A microprocessor is connected to each of the temperature sensors and receives the ambient temperature and the pole temperature signals to control the motor starter operation based on the temperature inputs. The microprocessor is programmed to periodically monitor the ambient and power pole temperature signals and compare these signals against a fan-on limit, and if the signals exceed the fan-on limit, the control turns on the internal fans of the motor starter. The control continues to monitor the ambient and power pole temperatures and if either should exceed a maximum temperature limit, the motor starter is placed in a motor shutdown mode, unless an optional temperature override has been set. Upon motor shutdown, the control continues to monitor temperatures and track how long it takes for the motor starter to cool down, and if it takes too long to cool down, a maintenance flag is set to indicate that cleaning or preventive maintenance is required.

24 Claims, 4 Drawing Sheets

TEMPERATURE PROTECTION CONTROL FOR A MOTOR STARTER

BACKGROUND OF THE INVENTION

The present invention relates generally to control systems for motor starters, and more particularly to a method and apparatus to track temperature in a motor starter and control the motor starter based on the temperature tracking.

Many electrical devices use one form or another for thermal protection. One of the most common forms of temperature protection includes the use of thermistors, which are heat sensitive resistors that change resistive value with temperature change. Typically, the thermistor is connected to an electronic monitoring circuit which is set to react to a predetermined resistance value. When that resistance value is reached, the electronic monitoring circuit disconnects, or connects, the temperature protection circuits, which then turn the device off. Most electrical devices use a single thermistor for protection. Therefore, the level of protection provided is solely dependent on the location of that single thermistor. In other words, the thermal protection in reality protects only one small portion of the device. In larger devices, many components can be damaged before the thermal protection turns off the device. Another problem with such systems is that they provide little warning or assistance in diagnosing the cause of shutting down the device. Further, in some applications or processes, it is critical that the electrical device not be shutdown. In such processes, it would be desirable to have some indication of an overheating condition while keeping the process running.

Another common method of thermal protection is the use of a bi-metal strip or disk mounted within the device to open or close a circuit. Such devices change shape with heat due to a differential thermal expansion between the two metals that form the physical configuration. As the device changes shape, it exerts a physical force on a switch, or on a set of contacts, to change the state of an electrical circuit. That is, a normally opened circuit, for example, will close to activate a temperature protection circuit when the bi-metal strip deforms to a deflection point that corresponds to a temperature indicating an overheating condition. This form of thermal protection requires calibration by hand-bending or tweaking for each particular device. Further, accuracy is suspect after field adjustments are made and such bi-metal devices typically require invasive connections between components, thereby reducing manufactureability, increasing the cost of the component, and increasing the overall size of the electrical equipment.

Although many electrical devices, including motor starters, may rely on natural air convection for cooling, it is desirable to have some form of forced air for sufficient cooling. Forced air requires either a fan or blower to force the ambient air through or around the electrical device for added cooling. Fans or blowers add yet another element to the device that can fail without warning and decrease reliability of the equipment. Further, keeping the fans running at all times, uses excess energy.

It would be desirable to have a thermal protection scheme that would operate the fan only on an as-needed basis and provide some early indication that the system is not functioning correctly, while providing a device that protects the entire device efficiently and accurately.

SUMMARY OF THE INVENTION

The present invention provides a motor starter temperature protection control that solves the aforementioned problems without adding significant cost to the overall system.

A motor starter temperature protection control according to the present invention includes an ambient temperature sensor positioned on an inside cover of a motor starter to sense ambient temperature across the power poles and heat sinks and provide an ambient temperature signal indicative of the ambient temperature in the motor starter enclosure. A power pole temperature sensor is positioned in thermal communication with each power pole in the motor starter and produce pole temperature signals indicative of the temperature of each power pole. A microprocessor is connected to each of the temperature sensors and receives the ambient temperature signal and the pole temperature signals to control the motor starter operation based on the temperature inputs. The microprocessor is programmed to periodically monitor the ambient and power pole temperature signals and compare these signals against a fan-on limit, and if any of these signals exceed the fan-on limit, the control turns on the internal fans of the motor starter. The control continues to monitor the ambient and power pole temperatures and if either should exceed a maximum operating temperature limit, the motor starter is placed in a motor shutdown mode, unless an optional temperature override has been set. Upon motor shutdown, the control continues to monitor temperatures and track how long it takes for the motor starter to cool down, and if it takes too long to cool down, a maintenance flag is set to indicate that cleaning or preventive maintenance is required.

In accordance with one aspect of the invention, A motor starter temperature protection control includes an ambient temperature sensor to sense ambient temperature and provide an ambient temperature signal indicative of a temperature in a motor starter enclosure and at least one pole temperature sensor in thermal communication with an electrically conducting bus in a motor starter to produce a pole temperature signal indicative of a temperature of the electrically conducting bus. A processing unit is connected to the ambient temperature sensor and the pole temperature sensor and programmed to periodically monitor the ambient temperature signal and the pole temperature signal, compare the ambient temperature signal to a maximum temperature limit, compare the pole temperature signal to a maximum temperature limit, and then produce a fault signal if one of the ambient temperature and the pole temperature signals exceeds the maximum temperature limits.

In accordance with another aspect of the invention, a motor starter temperature protection control includes an ambient temperature sensor to sense ambient temperature and provide an ambient temperature signal indicative of a temperature in a motor starter enclosure and at least one pole temperature sensor in thermal communication with an electrically conducting bus and producing a pole temperature signal indicative of a temperature of the electrically conducting bus. A processing unit is connected to the ambient temperature sensor and the one pole temperature sensor and is programmed to periodically monitor and read the ambient temperature signal and the pole temperature signal upon motor shutdown, and create an ambient temperature profile and a pole temperature profile based on the ambient temperature signals and the pole temperature signals read during motor shutdown. The processor also compares the ambient temperature profile and the pole temperature profile to a cool down limit profile, and produces a maintenance indication if one or both of the ambient temperature profile and the pole temperature profile exceeds the cool down limit.

In accordance with yet another aspect of the invention, a method of tracking temperature in a motor starter and controlling the motor starter based on the temperature tracking includes periodically monitoring an ambient temperature and a pole temperature of each pole in a motor starter and comparing the ambient temperature to a maximum ambient temperature and producing a fault indication if the ambient temperature exceeds the maximum ambient temperature. The method also includes comparing each pole temperature to a maximum pole temperature and producing a fault if any pole temperature exceeds the maximum pole temperature. The method further includes determining any temperature deviation between poles in a multi-pole motor starter, and producing a temperature deviation fault if any temperature deviation between poles exceeds a pole temperature deviation limit.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
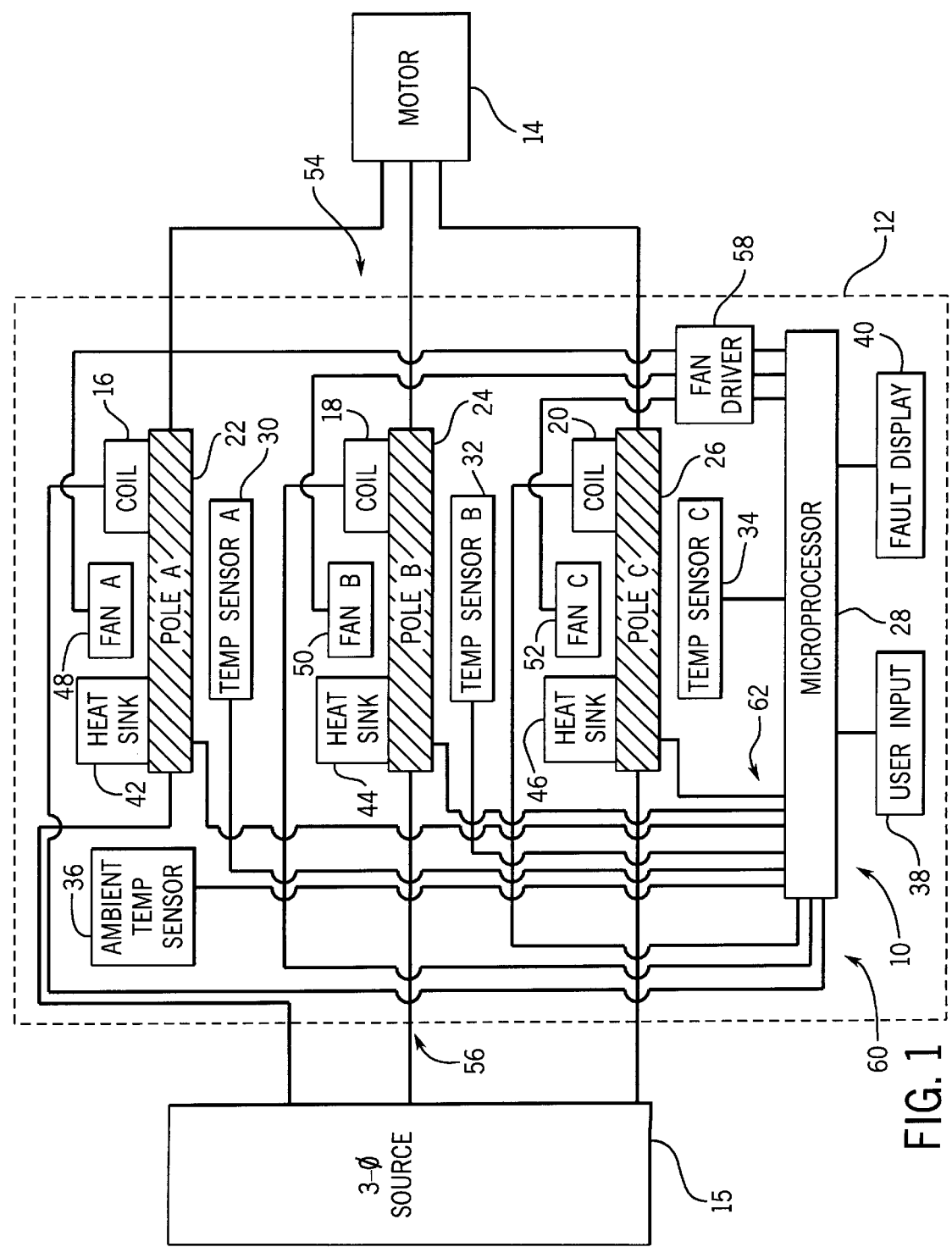
FIG. 1 is a block diagram of a motor connected to a three-phase source through a motor starter incorporating the present invention.

FIG. 1 is a block diagram of a motor starter temperature protection control 10 according to the present invention incorporated into a motor starter 12 controlling a motor 14 connected to a power source 15. Control 10 includes a central processing unit 28, such as a microprocessor, a microcontroller, a PLC, or any other device for electrical signal processing. The motor starter temperature protection control 10 controls the function of the motor starter 12 in an override manner based on the operating temperature of the device. As shown in FIG. 1, the control 10 of the present invention is shown in a three-phase motor starter application. In a manner that is known, the motor starter 12 relays power from a three-phase source 15 to the motor 14, in part by controlling coils 16, 18, and 20, and in part by controlling a pair of SCRs (not shown) that are typically clamped between two conducting bus bars, which is shown in block diagram form as pole A 22, pole B 24, and pole C 26.

The microprocessor 28 of the motor starter temperature protection control 10 receives input signals from a number of temperature sensors. In a preferred embodiment, a temperature sensor is located on each power pole. That is, temperature sensor A 30 is in thermal communication with power pole A 22, temperature sensor B 32 is in thermal communication with power pole B 24, and temperature sensor C 34 is in thermal communication with power pole C 26. An ambient temperature sensor 36 is also located within the motor starter 12 and connected to the microprocessor 28. In an preferred embodiment, the ambient temperature sensor 36 is located in a cover assembly between poles A and B or between poles B and C to sense the ambient temperature within the housing enclosing motor starter 12. The microprocessor 28 is also capable of receiving at least one input 38 for the temperature protection control 10, which can be a dip-switch for controlling whether the motor should be shutdown when a fault is detected and display the fault on fault display 40, or whether to maintain the motor operation and only display the fault on the fault display 40, for use in critical processes.

The motor starter 12 also includes heat sinks 42, 44, and 46 mounted to each power pole, 22, 24, and 26, respectively. Each power pole 22, 24, and 26 also has an associated fan 48, 50 and 52, respectively, to draw air into the load side 54 of the motor starter 12 and move the air across each heat sink 42, 44 and 46, and out a line side 56 of the motor starter 12. The microprocessor 28 is connected to a fan driver 58, which in turn drives the fans 48, 50 and 52. The microprocessor 28 also has output control lines 60 for controlling the coils 16, 18, and 20 as well as output control line 62 connected to control the SCRs of each pole 22, 24 and 26.

Figure 2A:
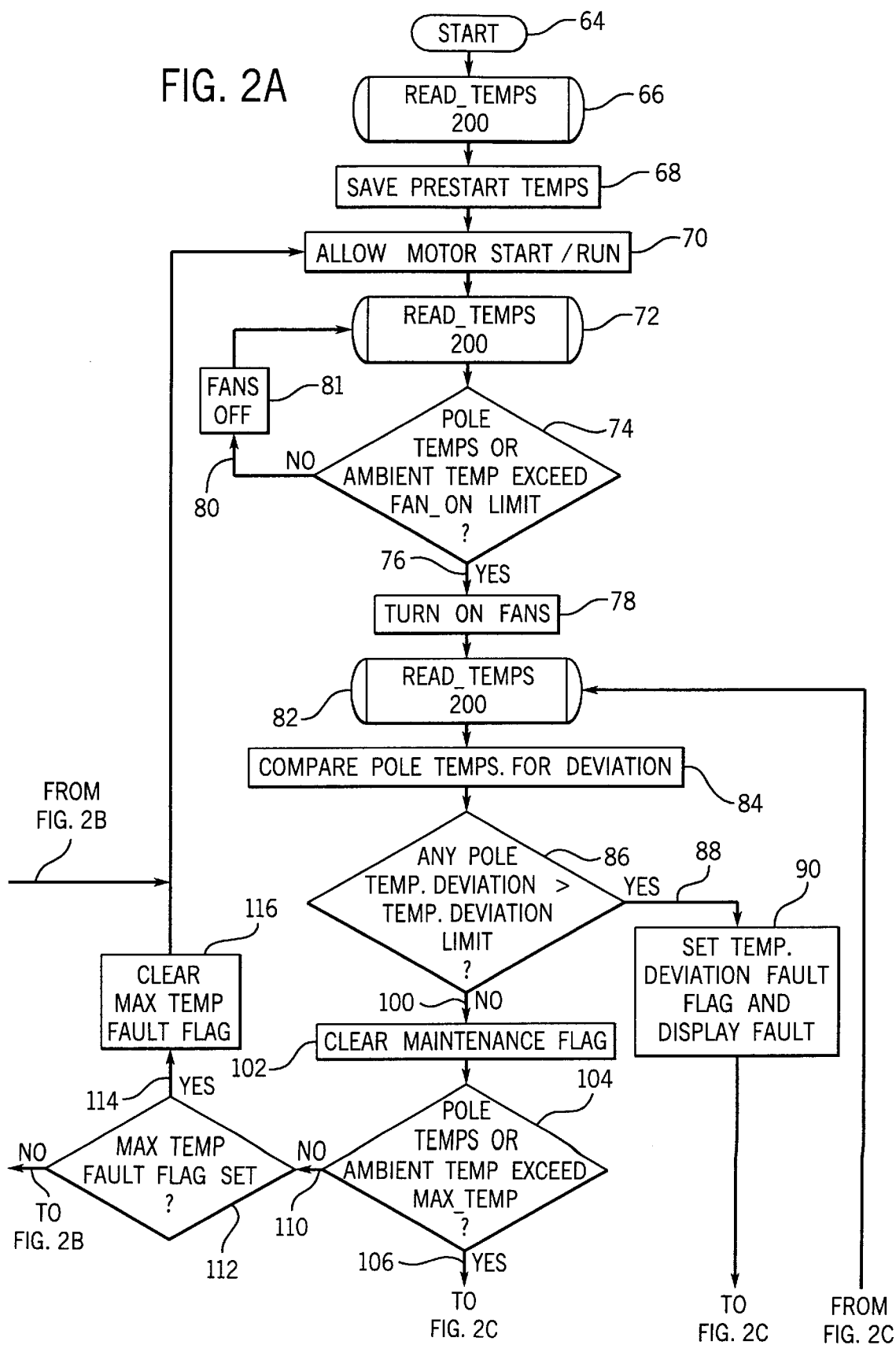
FIGS. 2A–2C is flow chart of the software as programmed in the microprocessor of FIG. 1.
Figure 2B:
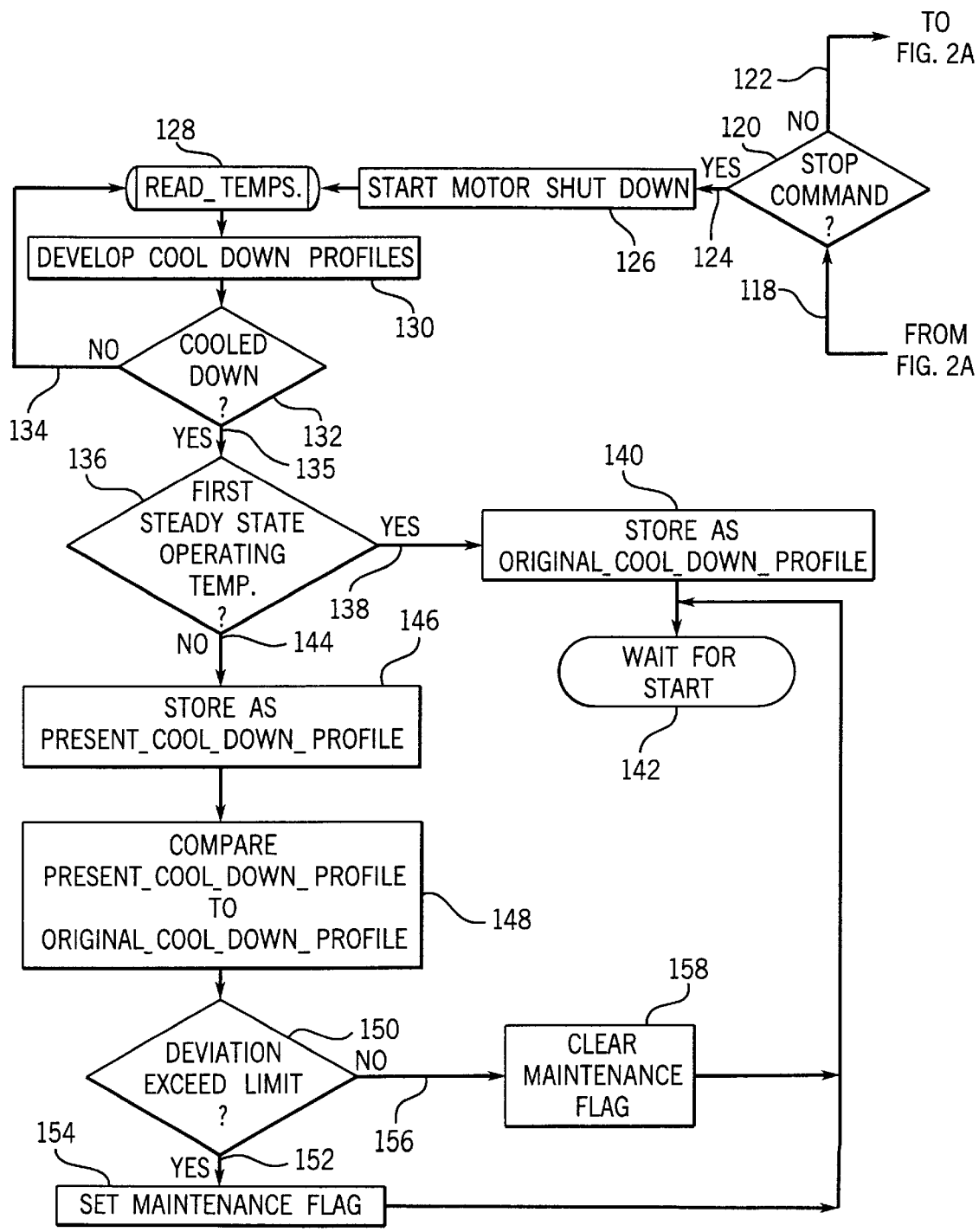
Figure 2C:
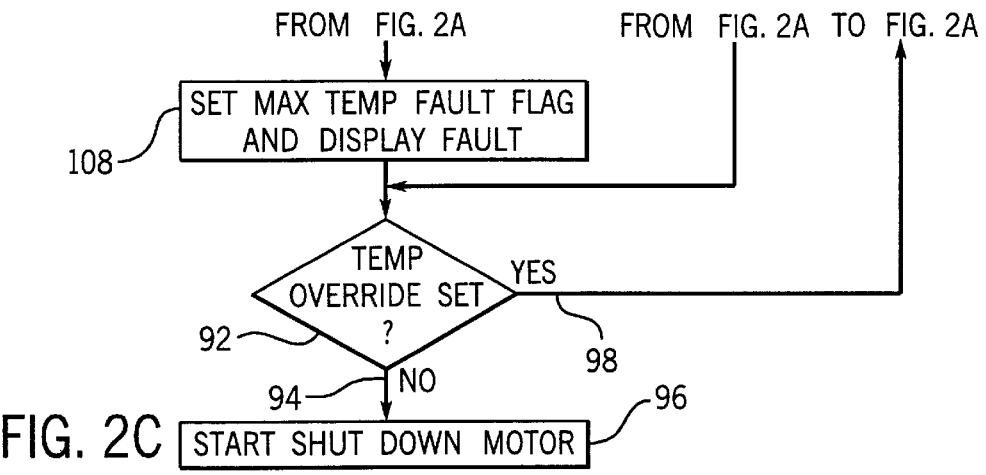

The operation of the control will now be described with reference to FIGS. 2–3. Referring to FIG. 2, the microprocessor is programmed, upon a start command 64, to read the temperatures in the motor starter prior to start-up of the motor at 66. The Read_Temps is a subroutine and is called a number of times in the main algorithm of FIG. 2, and is further described with reference to FIG. 3.

Figure 3:
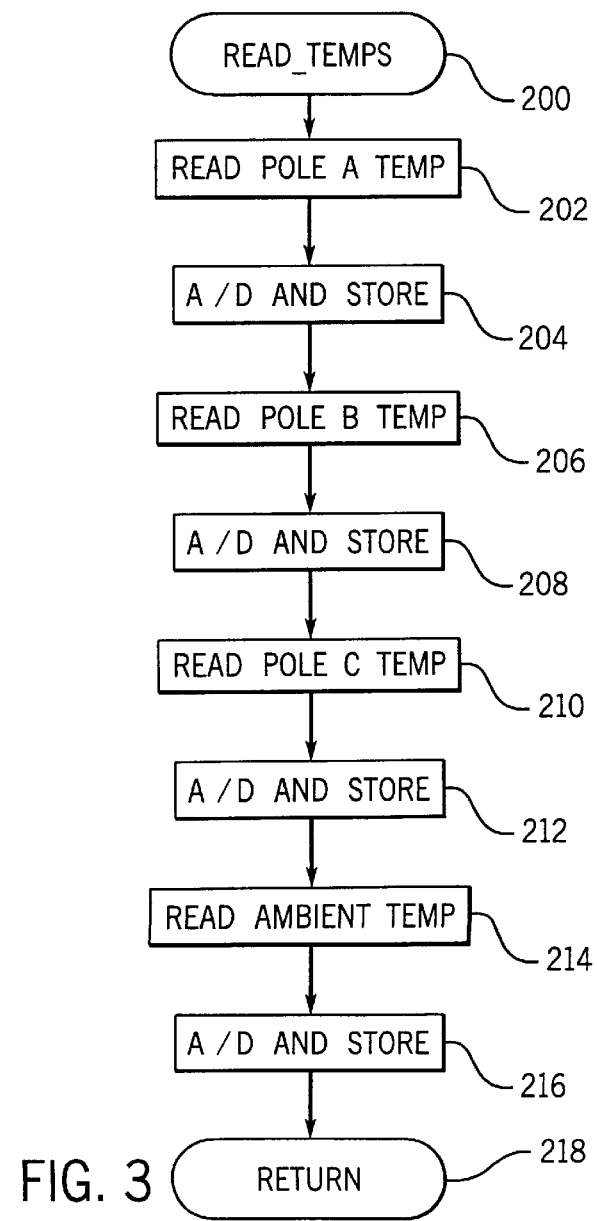
FIG. 3 is a flow chart subroutine as called for in the flow chart of FIG. 2.

Referring to FIG. 3, when the Read_Temps 200 is called, the microprocessor first reads the temperature of pole A 202 from the first temperature sensor, and after converting the analog signal to a digital signal and storing the result in memory 204, reads the temperature of pole B 206, converts the analog signal to digital, and stores the result in memory 208. The third temperature sensor is then read, acquiring the temperature of pole C 210, which is then stored as a digital value 212. The ambient temperature is read at 214, converted and stored at 216, and the Read_Temps subroutine returns 218 to the main algorithm of FIG. 2.

Referring back to FIG. 2, after the Read_Temps 200 algorithm is complete at 66, the initial values are saved at 68 and the motor is allowed to start 70. That is, the temperature protection control of the present invention relinquishes control of the motor starter to a main control, which is not a subject of this invention.

Once the motor is up and running, the temperatures of the power poles and the ambient are read 72, and if either the pole temperatures or the ambient temperature exceeds a predetermined fan-on limit 74, 76, the fans are turned on at 78. However, if the fan-on limit is not exceeded 74, 80, the fans are kept off 81, and the temperatures are again read 72. The fans are kept off as long as the pole temperatures and the ambient temperature does not exceed the fan-on limit. After the fans are turned on 78, the temperatures are read again at 82 and the temperatures of each of the poles A, B, and C are compared to one another at 84 to determine what, if any, deviation exists between poles A & B, B & C, and A & C. If any deviation between the poles exceeds a predetermined limit 86, 88, a temperature deviation fault flag is set and the fault is displayed 90.

A user temperature override bit is then checked at 92 to see whether or not the user has ordered that the motor not be stopped because of an overheating condition. If the temperature override bit has not been set 94, the system begins to shutdown the motor in an orderly manner 96. However, if the temperature override bit has been set 92, 98, the system continues back into the main algorithm to read the temperatures at 82. After comparing the pole temperatures for deviations 84 and if there is no deviation that exceeds the predetermined limit 86, 100, a maintenance flag is cleared 102 and the pole temperatures and the ambient temperatures are checked to see if they exceed a maximum temperature 104. If either the ambient temperature or any of the pole temperatures exceed the maximum temperature 104, 106, a maximum temperature fault flag is set and the fault is displayed 108. The temperature override bit is checked 92, again, if the bit has not been set 94, an orderly shutdown of the motor is begun at 96. If the temperature override bit has been set 92, 98, then the system continues to allow the motor to run and read the temperatures at 82.

If the system continues to run normally, that is, the pole temperatures do not deviate 84, 86, 100 and neither the pole temperatures nor the ambient temperatures exceeds a maximum temperature 104, 110, the maximum temperature fault flag is checked to see if it is set 112. If it has 114, then the flag is cleared 116 and the system continues to operate at 70. Of course, this last loop will not occur unless the temperature override bit is set at 92. If the maximum temperature fault flag had not been set 112, 118, then the system checks for a stop command 120. If none has occurred 122, the system returns to allowing the motor to run at 70. After reading the temperature at 72, if the temperature has fallen below the limit to keep the fans on 74, 80, the fans are turned off at 81 and the system continues to operate as previously described.

However, once a stop command is received 120, 124, the proper and orderly motor shutdown routine can begin 126, after which, the temperatures are read again at 128 to develop a cool down profile 130. The control checks the present temperatures 132, and as long as the motor starter has not yet cooled down 134, the temperatures are periodically read and the system stores in memory a cool down profile for each of the power poles and the ambient.

Once the system has cooled down 132, 135, if this was the first time the device was run and is shutting down only after reaching a steady state operating temperature 136, 138, then the cool down profile is stored as the original cool down profile for the device at 140 and the control then waits for another start command 142. After the first steady state operation of the device 136, 144, the cool down profile developed at 130 is stored as the present cool down profile 146. The present cool down profile is then compared to the original cool down profile 148, and if a deviation between the present cool down profile and the original cool down profile exceeds a predetermined limit 150, 152, then a maintenance flag is set 154 indicating that some corrective measure needs to be taken. For example, a slow cool down can indicate low air flow that may be due to one or more fans not operating correctly, the fan bearings may be degrading, the heat sinks require cleaning, or the air inlet and/or air outlet in the motor starter may be blocked. If there is no excessive deviation between the cool down profiles 150, 156, the maintenance flag is cleared 158 and the system waits for a next start command 142.

The present invention has been described in terms of the preferred embodiment, and it is recognized that equivalents, alternatives, and modifications, aside from those expressly stated, are possible and within the scope of the appending claims.

What is claimed is:

1. A motor starter temperature protection control comprising:

an ambient temperature sensor to sense ambient temperature and provide an ambient temperature signal indicative of a temperature in a motor starter enclosure;

at least one pole temperature sensor in thermal communication with an electrically conducting bus in a motor starter and producing a pole temperature signal indicative of a temperature of the electrically conducting bus;

a processing unit connected to the ambient temperature sensor and the at least one pole temperature sensor, the processing unit programmed to:

periodically monitor the ambient temperature signal and the pole temperature signal;

compare the ambient temperature signal to a maximum temperature limit;

compare the pole temperature signal to a maximum temperature limit; and produce a fault signal if one of the ambient temperature and the pole temperature signals exceeds the maximum temperature limits.

2. The control of claim 1 wherein the processing unit is further programmed to turn on a fan only when either the ambient temperature signal or the pole temperature signal exceeds a fan-on limit and turns the fan off when either the ambient temperature signal or the pole temperature signal falls below the fan-on limit.

3. The control of claim 1 further comprising:

a display device connected to the processing unit to display an external warning indicating an overheat condition;

a user input capable of selecting an override mode; and wherein the processing unit is further programmed to shutdown a motor and activate the display device when a fault signal is produced, and only activate the display device if the override mode is selected from the user input and not shutdown the motor when a fault signal is produced.

4. The control of claim 1 further comprising:

a motor starter having three power poles, each power pole having a heat sink thereon and a fan in thermal communication with the heat sink;

three pole temperature sensors, each sensor in thermal communication with a power pole of the motor starter and producing first, second, and third pole temperature signals; and wherein the processing unit is further programmed to:

determine a 1-2 deviation between the first and second pole temperature signals;

determine a 2-3 deviation between the second and third pole temperature signals;

determine a 1-3 deviation between the first and third pole temperature signals;

compare the 1-2, 2-3, and 1-3 deviations to a pole temperature deviation limit; and produce a temperature deviation fault if any of the 1-2, 2-3, and 1-3 deviations exceed the pole temperature deviation limit.

5. The control of claim 4 further comprising:

an alarm indicator output to receive the temperature deviation fault and produce an alarm indication when the temperature deviation fault is present; and a user override input that when active overrides motor shutdown when a fault signal is present.

6. The control of claim 1 wherein the processing unit is further programmed to:

track motor cool down by periodically reading the ambient temperature signal and the pole temperature signal;

create an ambient temperature profile and a pole temperature profile based on the ambient temperature signals and the pole temperature signals read during the motor cool down;

compare the ambient temperature profile and the pole temperature profile to a cool down limit; and produce a maintenance indication if one or both of the ambient temperature profile and the pole temperature profile exceeds the cool down limit.

7. The control of claim 6 wherein the processing unit is further programmed to:
create an original ambient cool down profile and an original pole temperature profile; and
compare the original ambient cool down profile and original pole temperature profile to a present state ambient cool down profile and a pole temperature profile.

8. A motor starter temperature protection control comprising:
an ambient temperature sensor to sense ambient temperature and provide an ambient temperature signal indicative of a temperature in a motor starter enclosure;
at least one pole temperature sensor in thermal communication with an electrically conducting bus and producing a pole temperature signal indicative of a temperature of the electrically conducting bus;
a processing unit connected to the ambient temperature sensor and the at least one pole temperature sensor, the processing unit programmed to:
periodically monitor and read the ambient temperature signal and the pole temperature signal upon motor shutdown;
create an ambient temperature profile and a pole temperature profile based on the ambient temperature signals and the pole temperature signals read during motor shutdown;
compare the ambient temperature profile and the pole temperature profile to a cool down limit profile; and
produce a maintenance indication if one or both of the ambient temperature profile and the pole temperature profile exceeds the cool down limit.

9. The control of claim 8 wherein the processing unit is further programmed to:
create an original ambient cool down profile and an original pole temperature profile; and
compare the original ambient cool down profile and original pole temperature profile to a present state ambient cool down profile and a pole temperature profile.

10. The control of claim 8 wherein the processing unit is further programmed to:
periodically monitor the ambient temperature signal and the pole temperature signal while in a motor run mode;
compare the ambient temperature signal to a maximum ambient temperature limit;
compare the pole temperature signal to a maximum pole temperature limit; and
produce a fault signal if one or both of the ambient temperature and the pole temperature signals exceeds the maximum temperature limits.

11. The control of claim 10 wherein the processing unit is further programmed to turn on a fan only when either or both of the ambient temperature signal or the pole temperature signal exceeds a fan-on limit and turns the fan off when either the ambient temperature signal or the pole temperature signal falls below the fan-on limit.

12. The control of claim 11 further comprising:
a display device connected to the processing unit to display an external warning indicating an overheat condition;
a user input capable of selecting an override mode; and wherein the processing unit is further programmed to shutdown a motor and activate the display device when a fault signal is produced, and only activate the display device if the override mode is selected from the user input and not shutdown the motor when a fault signal is produced.

13. The control of claim 8 further comprising:
a motor starter having three power poles, each power pole having a heat sink thereon and a fan in thermal communication with the heat sink;
three pole temperature sensors, each sensor in thermal communication with a power pole of the motor starter and producing first, second, and third pole temperature signals; and
wherein the processing unit is further programmed to:
determine a 1-2 deviation between the first and second pole temperature signals;
determine a 2-3 deviation between the second and third pole temperature signals;
determine a 1-3 deviation between the first and third pole temperature signals;
compare the 1-2, 2-3, and 1-3 deviations to a pole temperature deviation limit; and
produce a temperature deviation fault if any of the 1-2, 2-3, and 1-3 deviations exceed the pole temperature deviation limit.

14. The control of claim 13 further comprising:
an alarm indicator output to receive the temperature deviation fault and produce an alarm indication when the temperature deviation fault is present; and
a user override input that when active overrides motor shutdown when a fault signal is present.

15. A method of tracking temperature in a motor starter and controlling the motor starter based on the temperature tracking comprising the steps of:
periodically monitoring an ambient temperature and a pole temperature of each pole in a motor starter;
comparing the ambient temperature to a maximum ambient temperature and producing a fault indication if the ambient temperature exceeds the maximum ambient temperature;
comparing each pole temperature to a maximum pole temperature and producing a fault if any pole temperature exceeds the maximum pole temperature;
determining any temperature deviation between poles in a multi-pole motor starter; and
producing a temperature deviation fault if any temperature deviation between poles exceeds a pole temperature deviation limit.

16. The method of claim 15 further comprising the step of turning on a fan only when the ambient temperature, the pole temperature, or both, exceeds a fan-on limit.

17. The method of claim 15 further comprising the steps of:
preventing continued motor operation when a fault is produced and generating a noticeable indication when a fault occurs; and
providing a system override to disable shutting the motor down when a fault occurs and only producing the noticeable indication when the fault occurs.

18. The method of claim 15 further comprising the steps:
tracking motor cool down by periodically monitoring the ambient temperature and the pole temperature after entering a motor shutdown mode;
creating ambient temperature and pole temperature profiles based on continued readings of the ambient temperature and the pole temperature after motor shutdown as the motor starter cools;

comparing the ambient temperature profile and the pole temperature profile to a cool down limit profile; and producing a maintenance indication if either or both of the ambient temperature or the pole temperature profiles exceeds the cool down limit.

19. The method of claim 1 further comprising the steps of:

creating an original ambient cool down profile and an original pole temperature profile based on an ambient cool down temperature and a pole cool down temperature during shutdown mode after the motor starter ran at a first steady state operating temperature;

storing the original ambient cool down profile and the original pole temperature profile in memory for later use during subsequent motor starter cool downs; and comparing a present state ambient cool down profile and a present state pole temperature profile to the original ambient cool down profile and the original pole temperature profile, respectively, to determine if maintenance of the motor starter is required.

20. An apparatus for tracking temperature in a motor starter and controlling the motor starter based on temperature tracking comprising:

means for periodically monitoring an ambient temperature and a pole temperature of each pole in a motor starter;

means for comparing the ambient temperature to a maximum ambient temperature and producing a fault indication if the ambient temperature exceeds the maximum ambient temperature;

means for comparing each pole temperature to a maximum pole temperature and producing a fault if any pole temperature exceeds the maximum pole temperature;

means for determining any temperature deviation between poles in a multi-pole motor starter; and means for producing a temperature deviation fault if any temperature deviation between poles exceeds a pole temperature deviation limit.

21. The apparatus of claim 20 further comprising a means for turning on a fan only when any of the ambient temperature and the pole temperature exceeds a fan-on limit.

22. The apparatus of claim 20 further comprising:

means for preventing continued motor operation when a fault is produced and generating a noticeable indication when a fault occurs; and means for providing a system override to disable motor shutdown when a fault occurs and only producing the noticeable indication when the fault occurs.

23. The apparatus of claim 20 further comprising:

means for tracking motor cool down by periodically monitoring the ambient temperature and the pole temperature after entering a motor shutdown mode;

means for creating ambient temperature and pole temperature profiles based on the ambient temperature and the pole temperature after motor shutdown as the motor starter cools;

means for comparing the ambient temperature profile and the pole temperature profile to a cool down limit; and means for producing a maintenance indication if any of the ambient temperature and the pole temperature profiles exceeds the cool down limit.

24. The apparatus of claim 20 further comprising:

means for creating an original ambient cool down profile and an original pole temperature profile based on an ambient cool down temperature and a pole cool down temperature during shutdown mode after the motor starter ran a first time in a steady state operating temperature;

means for storing the original ambient cool down profile and the original pole temperature profile in memory for continued use during subsequent motor starter cool downs; and means for comparing a present state ambient cool down profile and a present state pole temperature profile to the original ambient cool down profile and the original pole temperature profile, respectively, for determining if maintenance of the motor starter is required.

* * * * *